US012168381B2

(12) United States Patent
Danze

(10) Patent No.: US 12,168,381 B2
(45) Date of Patent: Dec. 17, 2024

(54) RADIUS ROD BRACE PLATE

(71) Applicant: Super ATV, LLC, Madison, IN (US)

(72) Inventor: Marcelo Danze, Aliso Viejo, CA (US)

(73) Assignee: Super ATV, LLC, Madison, IN (US)

(*) Notice: Subject to any disclaimer, the term of this patent is extended or adjusted under 35 U.S.C. 154(b) by 379 days.

(21) Appl. No.: 17/858,787

(22) Filed: Jul. 6, 2022

(65) Prior Publication Data

US 2023/0008863 A1  Jan. 12, 2023

Related U.S. Application Data

(60) Provisional application No. 63/218,798, filed on Jul. 6, 2021.

(51) Int. Cl.
*B60G 7/00* (2006.01)

(52) U.S. Cl.
CPC .................... *B60G 7/001* (2013.01)

(58) Field of Classification Search
CPC .......... B60G 7/001; B60G 7/008; B60G 7/00; B60G 3/18; B60G 3/20; B60G 2200/14; B60G 2200/144; B60G 2300/07; B60G 2204/14; B60G 2204/143; B60G 9/003; B60G 5/00; B60G 5/04; B60G 11/14; B60G 15/04; B62D 21/18

See application file for complete search history.

(56) References Cited

U.S. PATENT DOCUMENTS

| | | | |
|---|---|---|---|
| 10,661,626 B2* | 5/2020 | Hisamura | |
| 10,737,547 B2* | 8/2020 | Deckard | |
| 10,946,736 B2* | 3/2021 | Fischer | |
| 10,967,694 B2* | 4/2021 | Brady | |
| 11,352,055 B2* | 6/2022 | De Grammont | |
| 11,571,939 B2* | 2/2023 | Berardi | |
| 11,572,110 B2* | 2/2023 | Levin | |
| 11,628,722 B2* | 4/2023 | Rasa | |
| 11,958,535 B2* | 4/2024 | Gordon | |
| 2022/0055434 A1* | 2/2022 | Hansen | |
| 2023/0182812 A1* | 6/2023 | Gordon | |
| 2023/0347701 A1* | 11/2023 | Heor | |

* cited by examiner

*Primary Examiner* — Jeffrey J Restifo
*Assistant Examiner* — Nicholas R. Kandas
(74) *Attorney, Agent, or Firm* — Woodard, Emhardt, Henry, Reeves & Wagner, LLP

(57) ABSTRACT

A brace plate assembly for a vehicle with a top right radius rod fastened to the chassis with a fastener, a top left radius rod fastened to the chassis, a middle right radius rod fastened to the chassis, a middle left radius rod fastened to the chassis, a bottom right radius rod fastened to the chassis and a bottom left radius rod fastened to the chassis, the brace assembly including a top plate coupled with the top right and left radius rods to the chassis, a bottom plate coupled with the bottom right and left radius rods to the chassis, and a bridge plate coupled with the middle right and left radius rods to the chassis and wherein the bridge plate is coupled to the top plate and the bottom plate.

18 Claims, 10 Drawing Sheets

RADIUS ROD BRACE PLATE

CROSS-REFERENCE TO RELATED APPLICATIONS

This application claims the benefit of U.S. Provisional Application No. 63/218,798, filed Jul. 6, 2021, which is hereby incorporated by reference.

BACKGROUND

The present disclosure relates to brace plates that reinforce mounting locations for radius rods on Utility Terrain Vehicles (UTV).

Brace plates are optionally used to reinforce the rear suspension on UTVs. Brace plates can help distribute forces on the fasteners used to couple radius rods to the UTV chassis. One type of prior art brace plate uses a unitary plate body to cover all the fasteners coupling the rear radius rods to the UTV chassis. This type of brace plate may optimize force distribution between separate fasteners, but requires all the radius rods to be detached to access any one radius rod. An example of this type of brace plate can be found on the CanAm X3 line of UTV's. Another type of prior art brace plate uses a plurality of separate plates that each cover a different portion of rear radius rods. This type of brace plate facilitates accessing individual radius rods without detaching all the radius rods, but cannot distribute force between all the separate fasteners since each brace plate is coupled to a subset of fasteners.

There is a need for an improved brace plate that both facilitates access to individual radius rods while also providing as much force distribution between separate fasteners as possible. This can be accomplished through a combination of several design features described below.

DESCRIPTION OF THE SELECTED EMBODIMENTS

Figure 1:
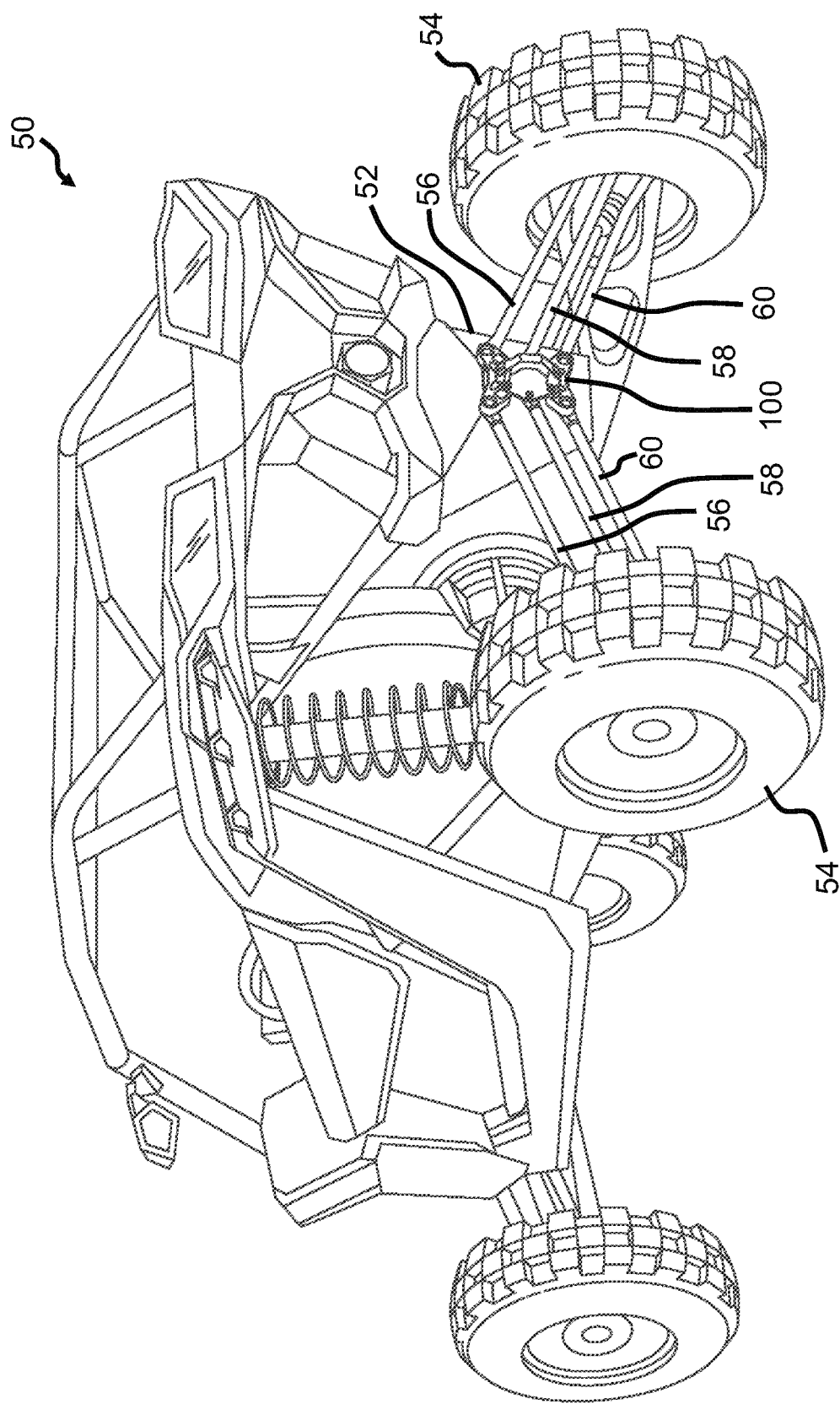
FIG. 1 is a perspective view of a Utility Terrain Vehicle incorporating a brace plate assembly.

For the purpose of promoting an understanding of the principles of the claimed invention, reference will now be made to the embodiments illustrated in the drawings and specific language will be used to describe the same. It will nevertheless be understood that no limitation of the scope of the claimed invention is thereby intended. Any alterations and further modifications in the described embodiments, and any further applications of the principles of the claimed invention as described herein are contemplated as would normally occur to one skilled in the art to which the claimed invention relates. One embodiment of the claimed invention is shown in great detail, although it will be apparent to those skilled in the relevant art that some features that are not relevant to the present claimed invention may not be shown for the sake of clarity.

With respect to the specification and claims, it should be noted that the singular forms "a", "an", "the", and the like include plural referents unless expressly discussed otherwise. As an illustration, references to "a device" or "the device" include one or more of such devices and equivalents thereof. It also should be noted that directional terms, such as "left", "right", "up", "down", "top", "bottom", and the like, are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

A radius rod (also called a radius arm, torque arm, torque spring, and torsion bar) is a suspension link intended to control wheel motion. The link is connected on one end to the wheel carrier or axle and on the other end to the chassis of the vehicle. In the case on at least one UTV, the rear suspension includes six separate radius rods, three as part of the right rear wheel suspension and three as part of the left rear wheel suspension. The three radius rods on each side are arranged in a vertical stack, as shown in FIG. 1. Each radius rod is fastened to the UTV chassis using separate fasteners. Prior art UTV's often include a single brace plate that covers each of the radius rods and is attached by each of the separate fasteners. The brace plate adds rigidity to the assembly and can reduce stress applied to individual fasteners by fixing the fastener on either side of the radius rod and by sharing applied forces between multiple fasteners. However, this arrangement requires removing the fasteners for each of the six radius rods in order to access any individual radius rod. It can then be difficult to arrange all six radius rods and the unitary brace plate to refasten the assembly. Reassembly often requires multiple individuals to hold everything in position to attach fasteners.

Figure 5:
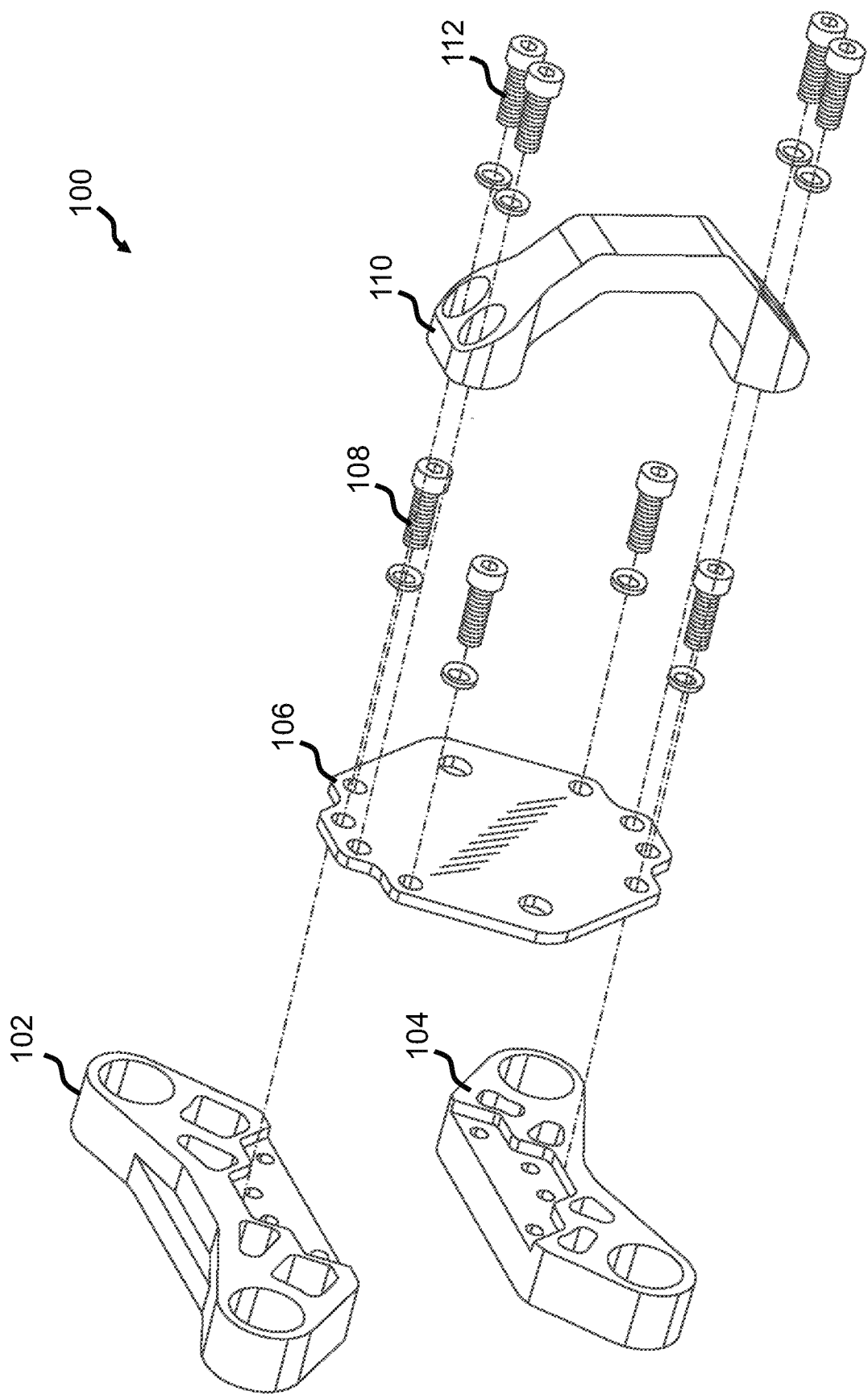
FIG. 5 is an assembly view of the FIG. 2 brace plate assembly.

Referring to FIG. 1, UTV 50 is shown. UTV 50 generally includes chassis 52, wheels 54, top radius rods 56, middle radius rods 58, bottom radius rods 60, fasteners 62 and fasteners 64 and brace plate assembly 100. Referring to FIG. 5, brace plate assembly 100 generally includes top plate 102, bottom plate 104, bridge plate 106 and fasteners 108. Brace plate assembly 100 also optionally includes tow hook 110 and fasteners 112.

Figure 8:
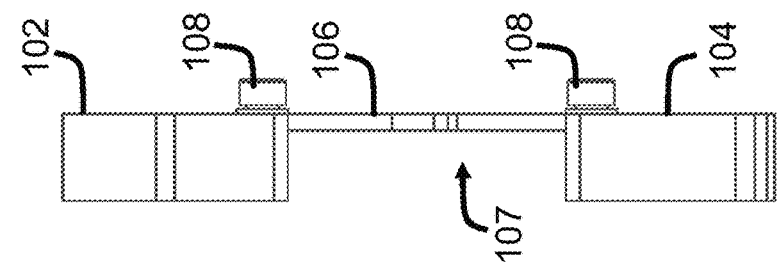
FIG. 8 is a left-side elevational view of the FIG. 6 brace plate assembly.
Figure 7:
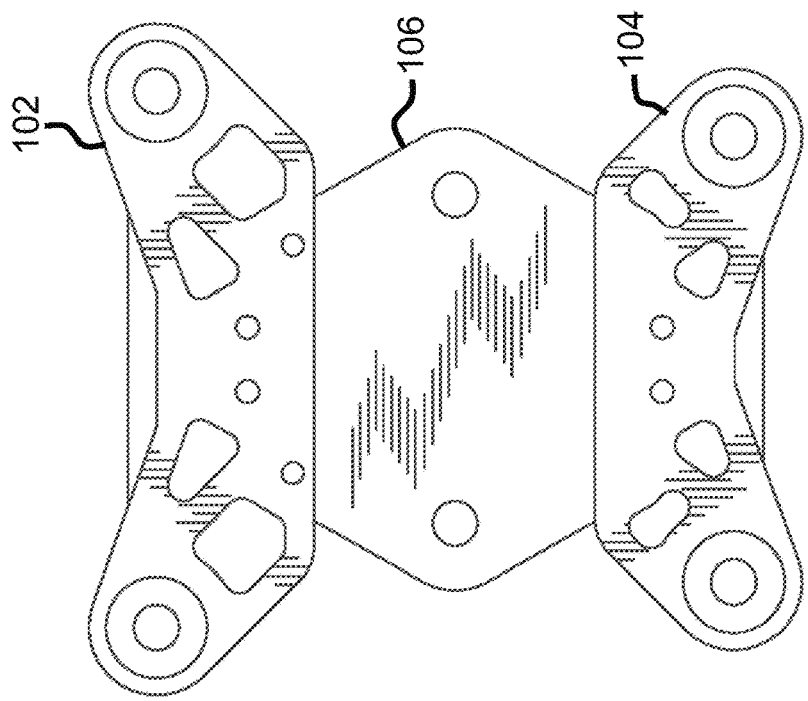
FIG. 7 is a bottom plan view of the FIG. 6 brace plate assembly.
Figure 6:
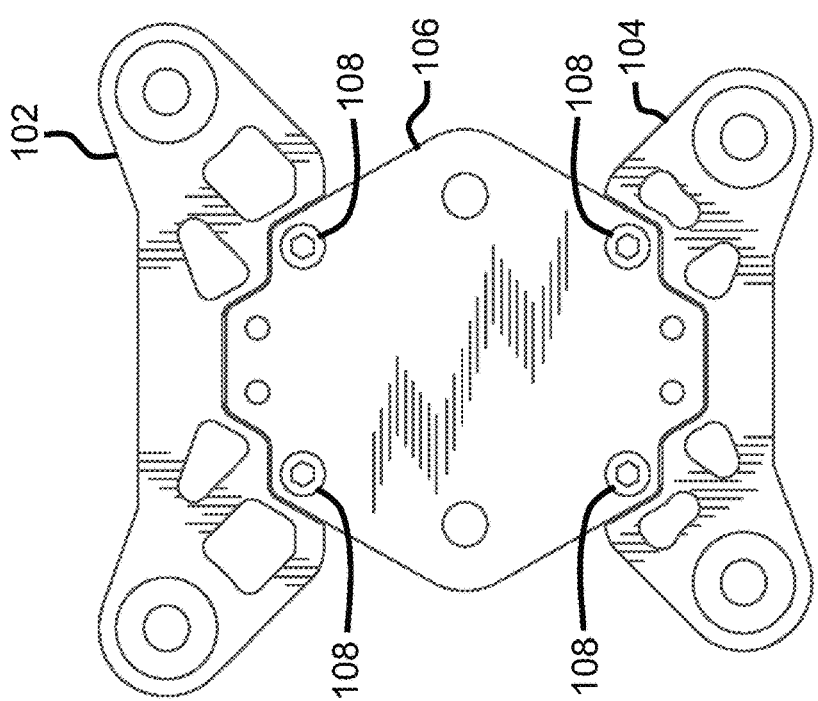
FIG. 6 is a top plan view of the FIG. 3 brace plate assembly.

Referring to FIGS. 6-8, brace plate assembly 100 is illustrated. Brace plate assembly 100 defines recess 107 under bridge plate 106 and between top plate 102 and bottom plate 104. Recess 107 is configured to match the profile of chassis 52 on UTV 50.

Figure 10:
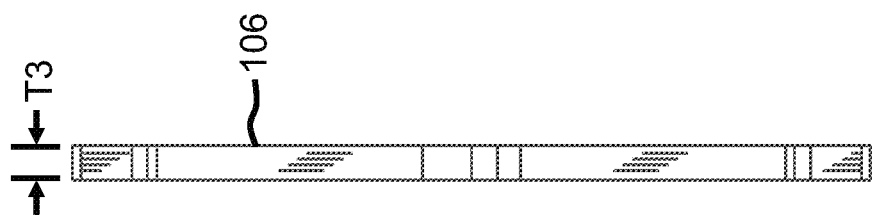
FIG. 10 is a left-side elevational view of the FIG. 9 bridge plate.
Figure 9:
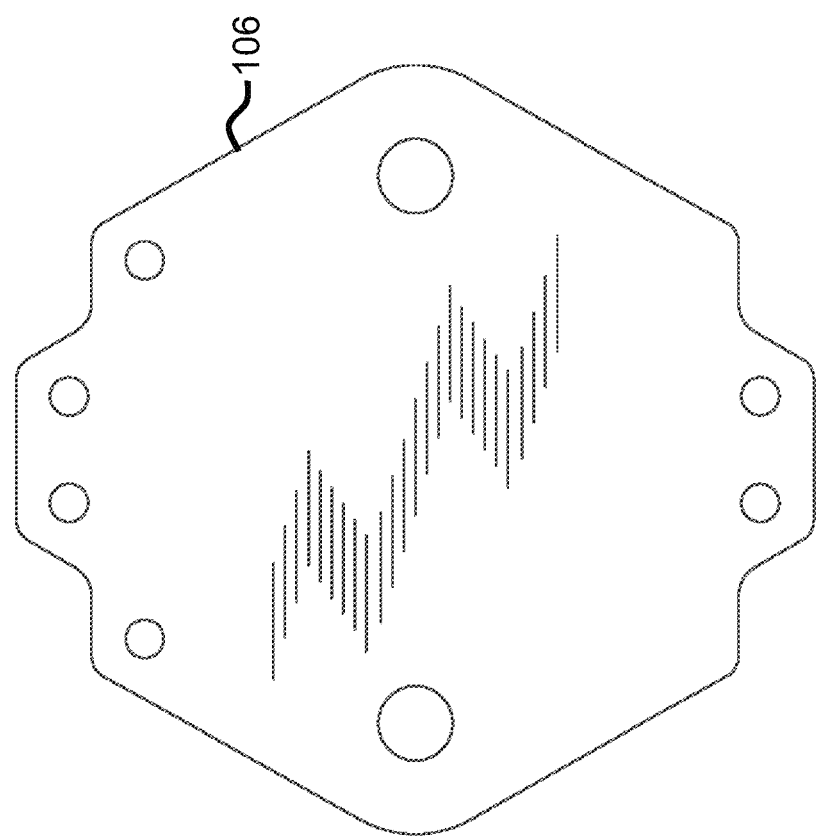
FIG. 9 is a top plan view of a bridge plate, a component of the FIG. 6 brace plate assembly.
Figure 12:
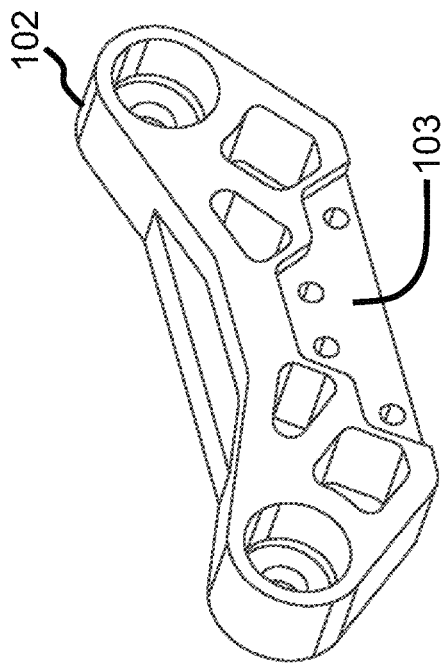
FIG. 12 is a top perspective view of the FIG. 11 top plate.
Figure 14:
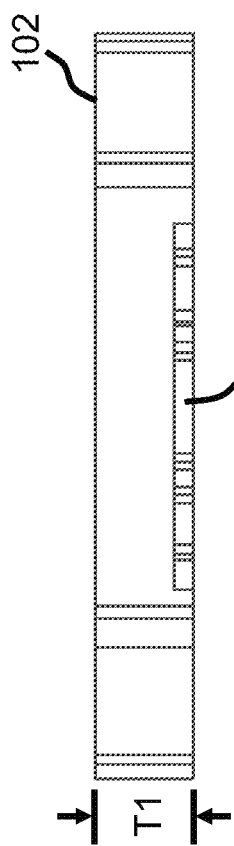
FIG. 14 is a rear elevational view of the FIG. 11 top plate.
Figure 11:
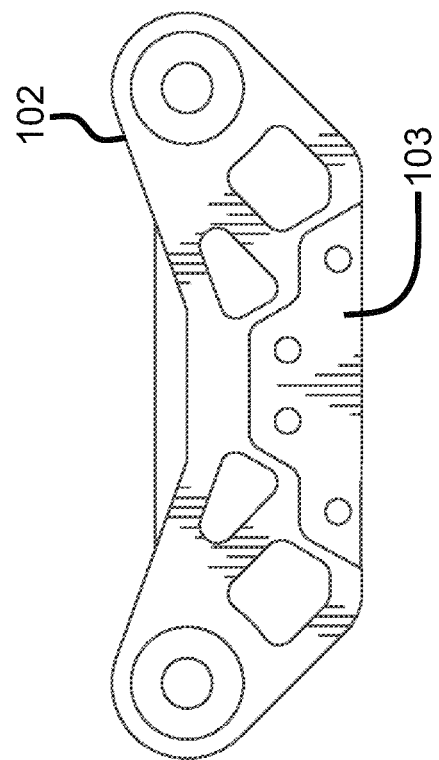
FIG. 11 is a top plan view of a top plate, a component of the FIG. 6 brace plate assembly.
Figure 13:
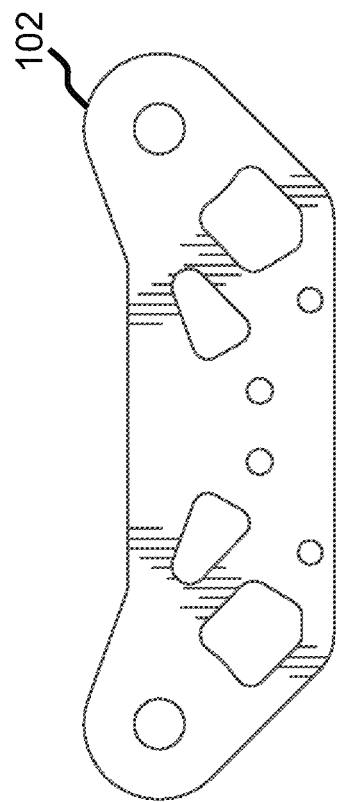
FIG. 13 is a bottom plan view of the FIG. 11 top plate.
Figure 16:
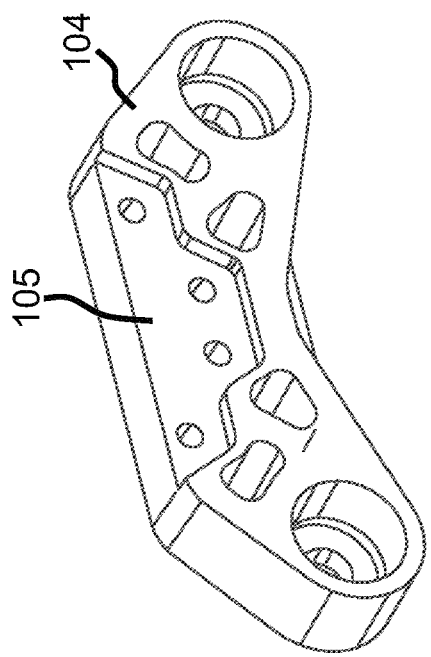
FIG. 16 is a top perspective view of the FIG. 15 bottom plate.
Figure 18:
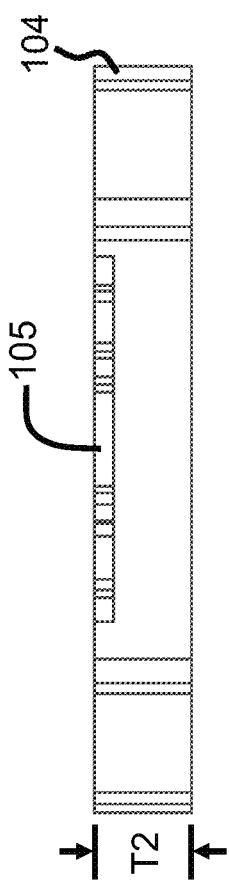
FIG. 18 is a front elevational view of the FIG. 15 bottom plate.
Figure 15:
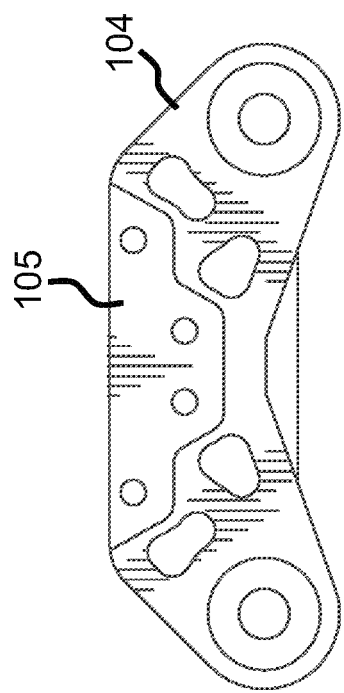
FIG. 15 is a top plan view of a bottom plate, a component of the FIG. 6 brace plate assembly.
Figure 17:
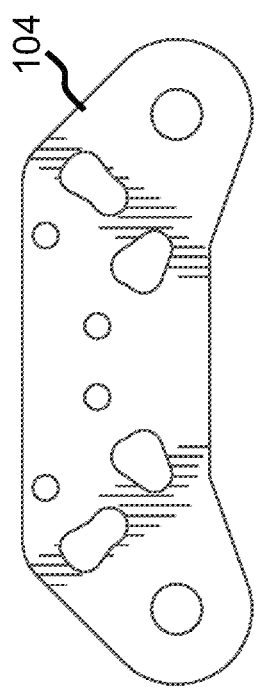
FIG. 17 is a bottom plan view of the FIG. 15 bottom plate.
Figure 22:
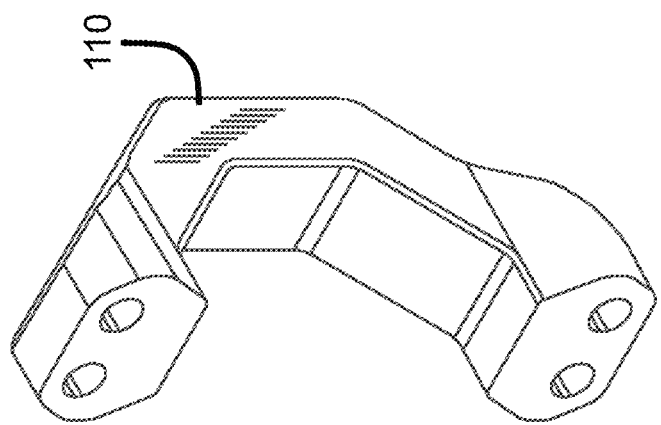
FIG. 22 is a bottom perspective view of the FIG. 19 tow hook.
Figure 21:
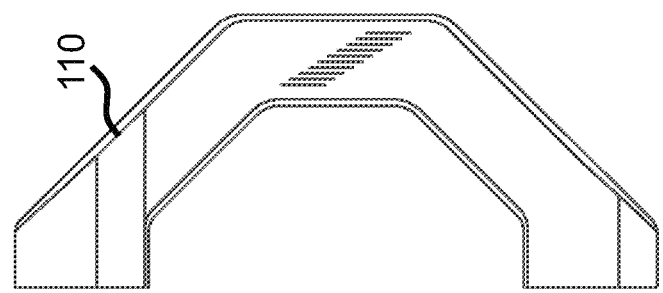
FIG. 21 is a right-side elevational view of the FIG. 19 tow hook.
Figure 20:
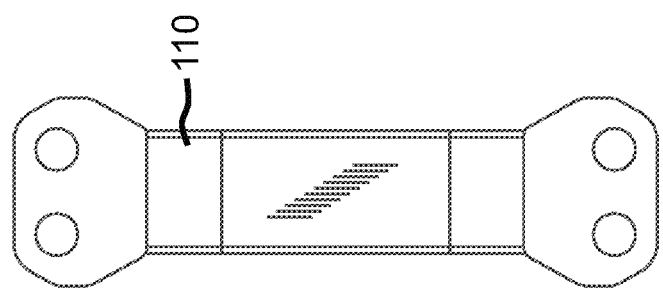
FIG. 20 is a bottom plan view of the FIG. 19 tow hook.
Figure 19:
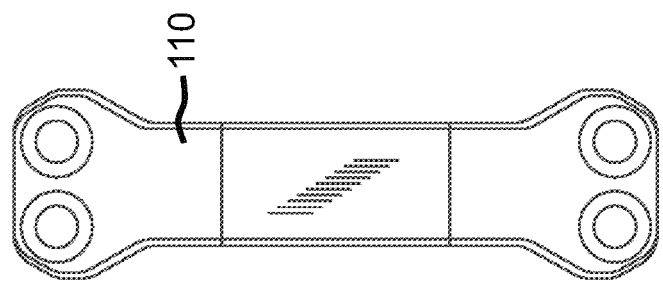
FIG. 19 is a top plan view of a tow hook, a component of the FIG. 5 brace plate assembly.

Referring to FIGS. 9-10, bridge plate 106 is illustrated. Bridge plate 106 has a thickness T3.

Referring to FIGS. 11-14, top plate 102 is illustrated. Top plate 102 defines contoured recess 103 configured to closely receive a portion of bridge plate 106. Top plate 102 has a thickness T1. In the illustrated embodiment, thickness T1 is greater than thickness T3.

Referring to FIGS. 15-18, bottom plate 104 is illustrated. Bottom plate 104 defines contoured recess 105 configured to closely receive a portion of bridge plate 106. Bottom plate 104 has a thickness T2. In the illustrated embodiment, Thickness T2 is equal to thickness T1.

Referring to FIGS. 19-22, tow hook 110 is illustrated. Tow hook 110 can be configured to act as a hitch for a trailer receiver or other accessory.

Figure 2:
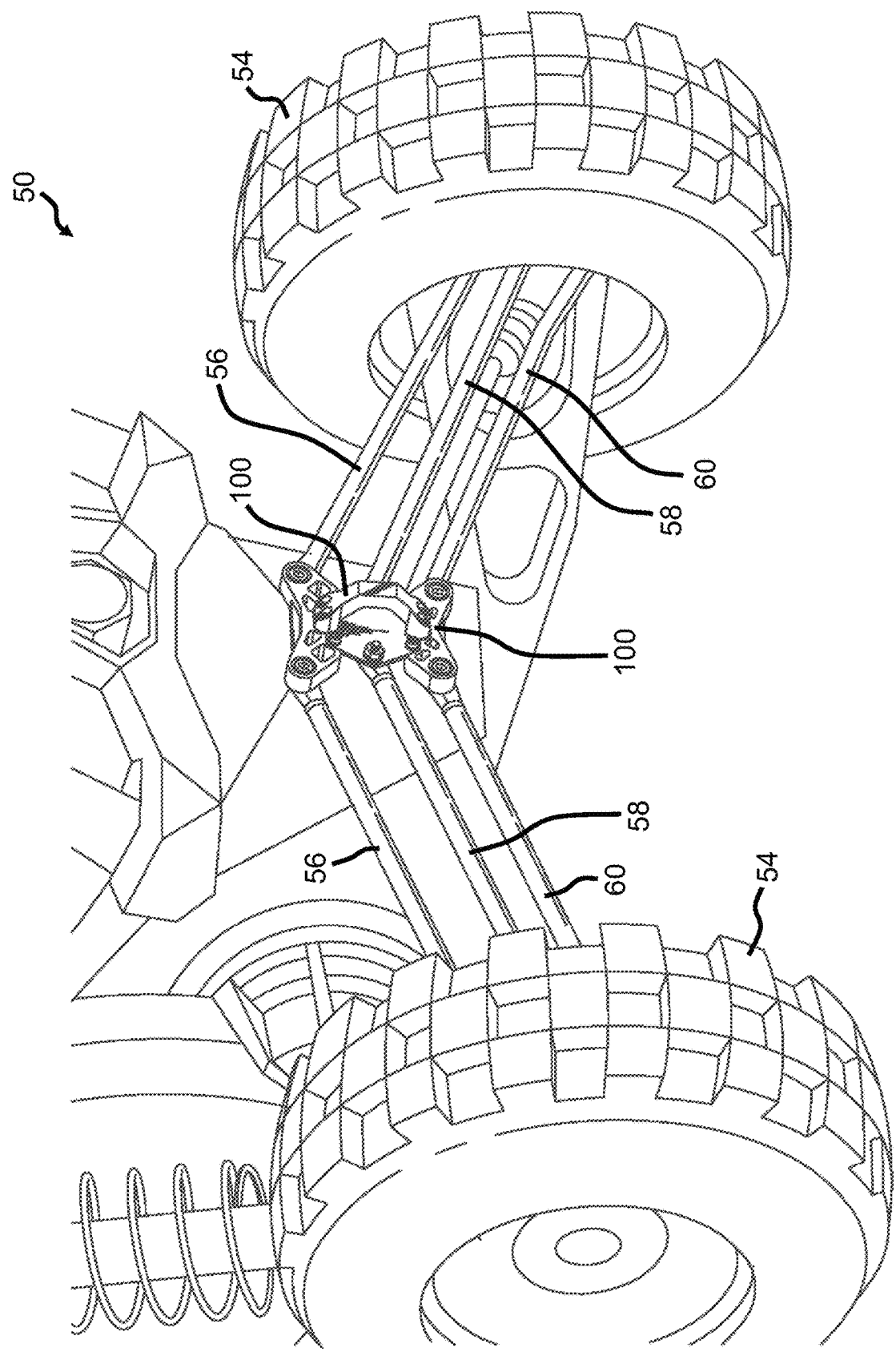
FIG. 2 is a perspective view of the brace plate assembly of FIG. 1.
Figure 3:
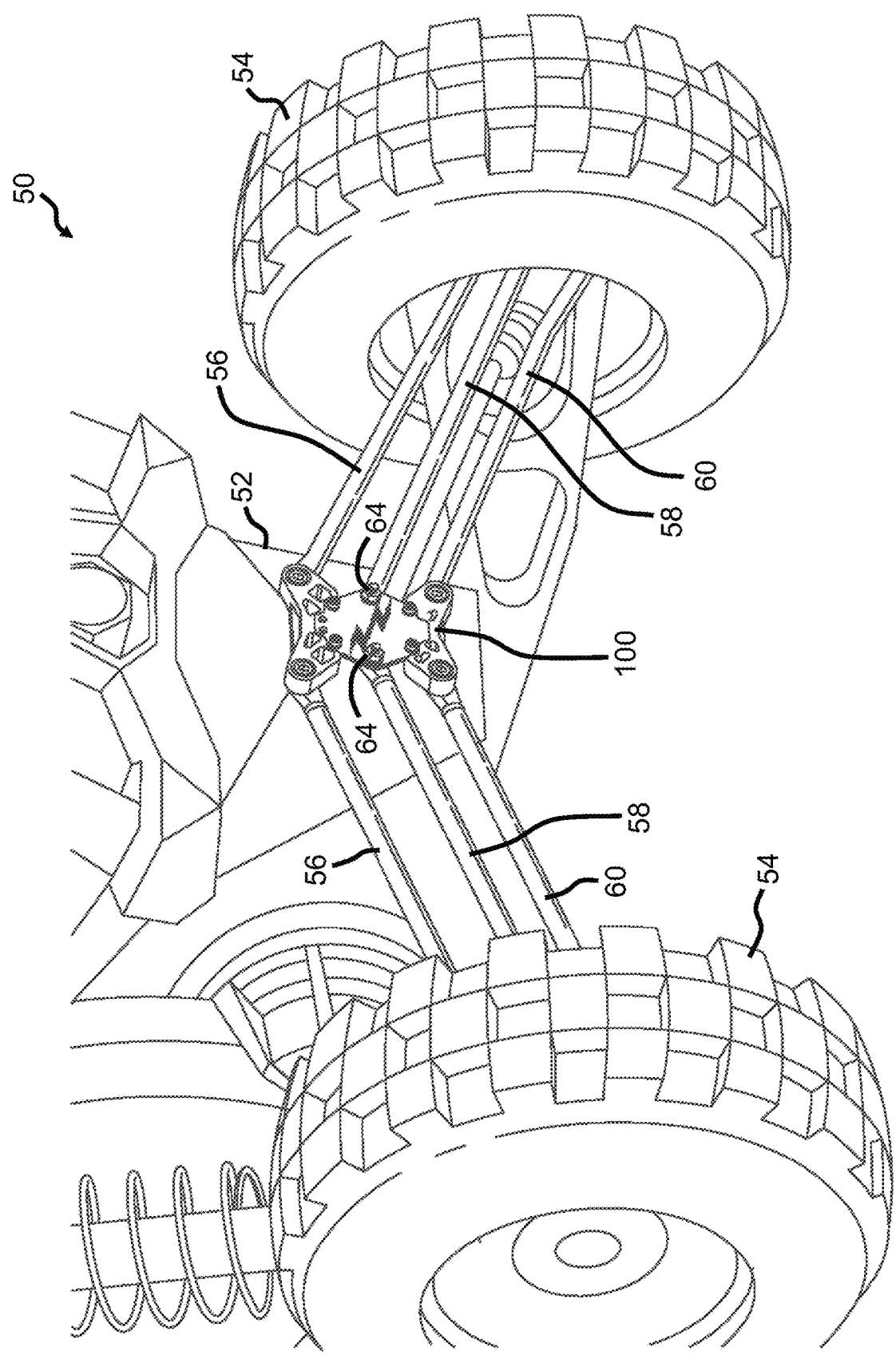
FIG. 3 is a perspective view of the FIG. 2 brace plate assembly without the tow hook.
Figure 4:
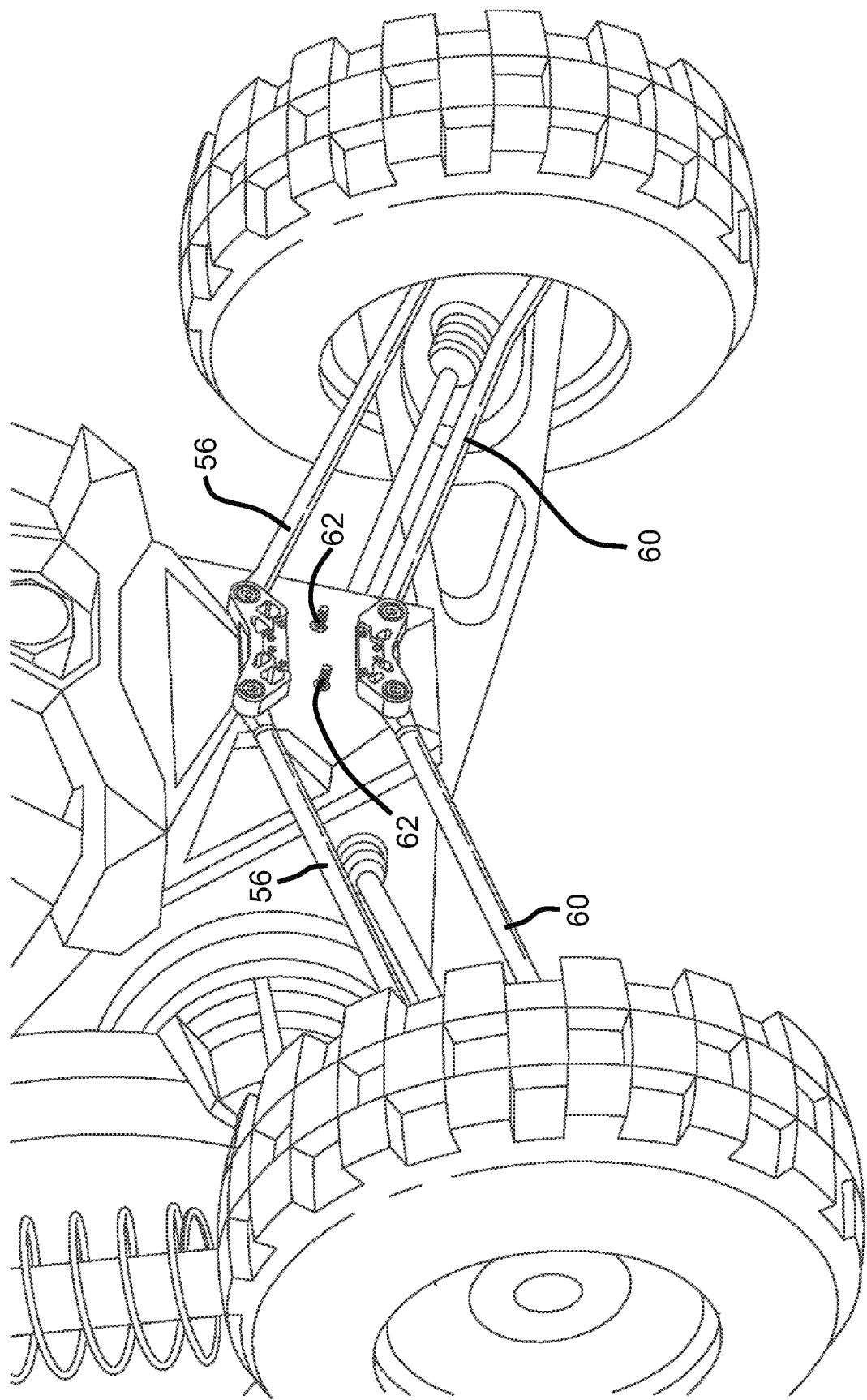
FIG. 4 is a perspective view of the FIG. 2 brace plate assembly without the bridge plate and the middle radius rods.

Brace plate assembly 100 is a modular assembly that allows access to individual radius rods without unfastening all six radius rods. Brace plate assembly 100 is assembled by attaching top plate 102 over top radius rods 56 and bottom plate 104 over bottom radius rods 60 using fasteners. This configuration is shown in FIG. 4. Bridge plate 106 is then attached over middle radius rods 58. Bridge plate 106 is positioned in recesses 103 and 105 in top and bottom plates 102 and 104. Bridge plate 106 is attached to top and bottom plates 102 and 104 using fasteners 108. This configuration is shown in FIG. 3. Optionally, tow hook 110 can be coupled to top and bottom plates 102 and 104 using fasteners 112. This configuration is shown in FIGS. 1 and 2.

The process is reversed to the extent necessary to access an individual radius rod if required. Because the radius rods are attached in pairs, rather than all 6 at once, attaching and removing can be accomplished by a single individual. Because bridge plate 106 is coupled to top and bottom plates 102 and 104 and because bridge plate 106 is received in contoured recesses 103 and 105 that closely receive bridge plate 106, the rigidity of brace plate assembly 100 can equal or exceed OEM unitary brace plates.

In the illustrated embodiments, fasteners 62 are threaded studs that extend from chassis 52 and fasteners 64 are nuts on fasteners 62. It is within the scope of this disclosure for fasteners 62 to be threaded recess in chassis 52 and fasteners 64 to be bolts. Alternatively, any other type of fastener can be used within the scope of this disclosure.

While the present disclosure has been described and illustrated in the context of an UTV, it should be understood that the disclosed assembly could be used with other types of vehicles including vehicles with more, the same number, or fewer radius rods.

While the present disclosure has been illustrated and described in detail in the drawings and foregoing description, the same is to be considered as illustrative and not restrictive in character, it being understood that a preferred embodiment has been shown and described and that all changes, equivalents, and modifications that come within the spirit of the claimed invention defined by following claims are desired to be protected.

The language used in the claims and the written description and in the above definitions is to only have its plain and ordinary meaning, except for terms explicitly defined above. Such plain and ordinary meaning is defined here as inclusive of all consistent dictionary definitions from the most recently published (on the filing date of this document) general purpose Merriam-Webster dictionary.

The invention claimed is:

1. A brace plate assembly for a vehicle with a chassis, a top right rear radius rod fastened to the chassis with a first fastener, a top left rear radius rod fastened to the chassis with a second fastener, a middle right rear radius rod fastened to the chassis with a third fastener, a middle left rear radius rod fastened to the chassis with a fourth fastener, a bottom right rear radius rod fastened to the chassis with a fifth fastener and a bottom left rear radius rod fastened to the chassis with a sixth fastener, the brace assembly comprising:
   a top plate adapted to be coupled with the top right and left rear radius rods to the chassis with the first and second fasteners;
   a bottom plate adapted to be coupled with the bottom right and left rear radius rods to the chassis with the fifth and sixth fasteners; and
   a bridge plate adapted to be coupled with the middle right and left rear radius rods to the chassis with the third and fourth fasteners and wherein the bridge plate is coupled to the top plate and the bottom plate with seventh and eighth fasteners.

2. The brace plate assembly of claim 1, wherein the top plate defines a recess that closely receives a first portion of the bridge plate.

3. The brace plate assembly of claim 2, wherein the bottom plate defines a recess that closely receives a second portion of the bridge plate.

4. The brace plate assembly of claim 3, further comprising a tow hook.

5. The brace plate assembly of claim 4, wherein the tow hook is coupled to the top and bottom plates with a ninth fastener.

6. The brace plate assembly of claim 5, wherein the bridge plate is thinner than the top or bottom plates.

7. The brace plate assembly of claim 1, further comprising a tow hook.

8. The brace plate assembly of claim 7, wherein the tow hook is coupled to the top and bottom plates with a ninth fastener.

9. The brace plate assembly of claim 1, wherein the bridge plate is thinner than the top or bottom plates.

10. The brace plate assembly of claim 1, wherein the top right and left rear radius rods are positioned between the chassis and the top plate.

11. The brace plate assembly of claim 10, wherein the bottom right and left rear radius rods are positioned between the chassis and the bottom plate.

12. The brace plate assembly of claim 11, wherein the middle right and left rear radius rods are positioned between the chassis and the bridge plate.

13. A brace plate kit for replacing the brace plate on a vehicle, the brace plate kit comprising:
   a top plate configured to span the coupling position of two top radius rods;
   a bottom plate configured to span the coupling position of two bottom radius rods; and a bridge plate configured to span the coupling position of two middle radius rods, wherein the bridge plate is configured to be coupled to the top plate and the bottom plate.

14. The brace plate kit of claim 13, wherein the top plate defines a recess that closely receives a first portion of the bridge plate.

15. The brace plate kit of claim 14, wherein the bottom plate defines a recess that closely receives a second portion of the bridge plate.

16. The brace plate kit of claim 13, further comprising a tow hook.

17. The brace plate kit of claim 16, wherein the tow hook is adapted to be coupled to the top and bottom plates.

18. The brace plate kit of claim 13, wherein the bridge plate is thinner than the top or bottom plates.

* * * * *